Figure 1:
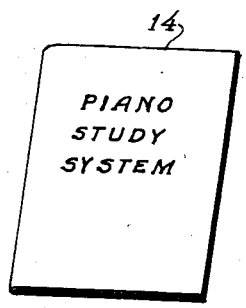
Figure 2:
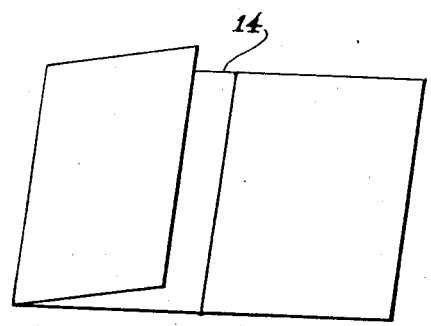
Figure 3:
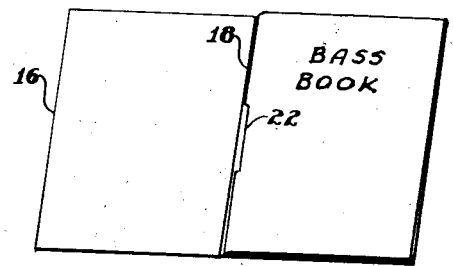
Figure 4:
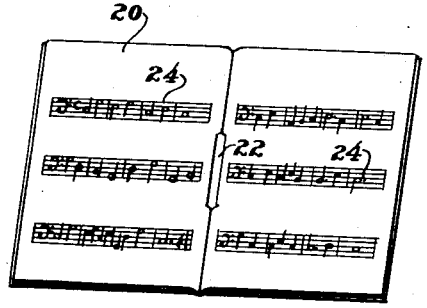

Sept. 18, 1945.  A. J. MARSH  2,385,093
TEACHING DEVICE
Filed June 20, 1944  2 Sheets-Sheet 1

INVENTOR
Arthur J. Marsh
BY Churchill & Jenney
ATTORNEYS

Sept. 18, 1945.   A. J. MARSH   2,385,093
TEACHING DEVICE
Filed June 20, 1944   2 Sheets-Sheet 2

INVENTOR
Arthur J. Marsh
BY
Churchill & Jenney
ATTORNEYS

Patented Sept. 18, 1945

2,385,093

UNITED STATES PATENT OFFICE 2,385,093

TEACHING DEVICE

Arthur J. Marsh, Wellesley, Mass.

Application June 20, 1944, Serial No. 541,165

4 Claims. (Cl. 35—1)

The present invention relates to teaching devices, and more particularly to devices for teaching the art of piano playing.

A beginner of the study of piano playing is presented at the outset with a number of problems. It is necessary to develop manual dexterity and strength by playing simple exercises and at the same time to acquire the ability to read and understand musical notation. Also, the pupil must gradually develop knowledge of the differences and relation between melodic parts and the accompaniment or bass therefor. This requires the pupil to play with both hands, but with different parts in each hand instead of in unison.

The difficulties involved in coordinating the movements of the hands, and at the same time attempting to follow the two different parts on the separate clefs, frequently cause a pupil to become confused and discouraged at this stage of the instruction. Each new exercise presents unfamiliar parts for both hands, requiring the pupil to divide his attention between the bass and the treble clefs, while attempting to execute the respective parts with his left and his right hands. Lacking the ability to read both staffs at a glance, the pupil concentrates alternately on first one and then the other clef, with the result that the actual execution by the two hands together is generally halting and unsatisfactory.

It is at this stage of the instruction that the teaching device of the present invention is intended to be employed. In particular, it is an object of the invention to provide a piano instruction book of such construction and arrangement as will permit the pupil, after learning a single bass part for the left hand, to play a variety of melodies or right hand parts, each with the same bass part as the accompaniment. This permits the pupil to devote most of his attention to the various melodies as they are presented in increasing order of difficulty, while nevertheless giving the pupil practice in two-part playing with an appropriate bass part in the left hand.

It is also contemplated that additional bass parts will be provided, so that the pupil may substitute new left hand parts of increasing difficulty while playing the same melodies in the right hand that were played with the first simple bass part. Thus the pupil in effect is faced with only one new part at a time in proceeding from one exercise to the next, with the result that execution becomes smoother and progress consequently more rapid.

The teaching device contemplated by the invention comprises, in effect, two books or sections, one of which is termed the bass book and the the other the melody book. The melody book contains a number of melodies or right hand parts written in the treble clef, the staffs being conventionally disposed on the several pages of the book. The pages of the book are, however, cut away in the region normally occupied by the bass clef or staff, so as to leave an opening corresponding to said staff through the body of the book.

The bass book, on the other hand, is provided with appropriately disposed bass parts of suitable harmonic structure to accompany the several melodies, but no treble parts appear where normally the melodic parts would be written. The two books are arranged to permit assembly in a relationship which permits the melodic or right hand parts to be viewed along with and in normal relation to the appropriate bass parts, which latter are seen through the openings or cut-outs in the melody book. By turning the various pages of the melody book, various melodies having substantially the same harmonic basis may be brought successively into juxtaposition to a single bass part to permit the pupil to play a variety of exercises without encountering with each new exercise unfamiliar parts in both hands at the same time.

Figure 5:
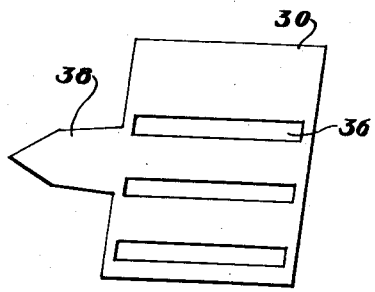
Figure 6:
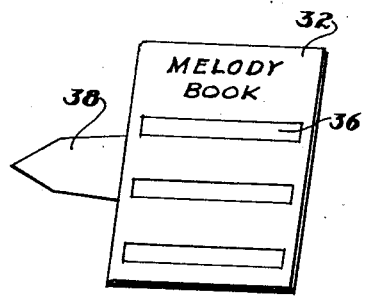
Figure 7:

The nature and construction of the teaching aid will become apparent from a consideration of the following description and accompanying drawings, in which Figs. 1–4 inclusive are views of the bass book; Figs. 5–7 inclusive are views of the melody book; and Figs. 8–10 inclusive show the manner in which the bass and melody books may be combined to provide juxtaposed melody and bass parts for playing together.

The bass book includes a cover 14 of suitable stiff material, which may conveniently be arranged in three sections (Fig. 2) to provide a double thickness left hand cover 16 which is joined along its top, outer and bottom margins to form a pocket open along the inner margin 18. The pages 20 of the bass book are conveniently bound in the cover, except that a centrally disposed section is cut away to leave a narrow open slot 22 through which access may be had to the pocket in the cover at whatever page the book may be opened.

The pages of the bass book carry a number of bass staffs 24, with simple bass parts written thereon following substantially the same simple harmonic pattern but differing in individual arrangement and difficulty. Thus some bass parts may require the playing of but one note at a time to create a chordal structure, while in others the notation may call for two or more notes to be struck simultaneously.

The melody book shown in Figs. 5, 6 and 7 comprises a backing 30 to which are attached pages 32 carrying music written in the treble staff only, as indicated at 34. This music may involve simple melodies arranged in increasing order of difficulty and appropriately related to the several bass parts in the bass book.

At the location on each page of the melody book where the bass staff would normally appear, the pages are cut away to leave longitudinal openings 36 somewhat larger in size than the bass staff. The treble clefs 34 and the openings 36 below the same are so disposed on the pages of the melody book that when a page 32, or more strictly the entire book, is superimposed on any page of the bass book, a suitable bass part is visible immediately below and in proper relation to the melody or treble part.

Figure 8:
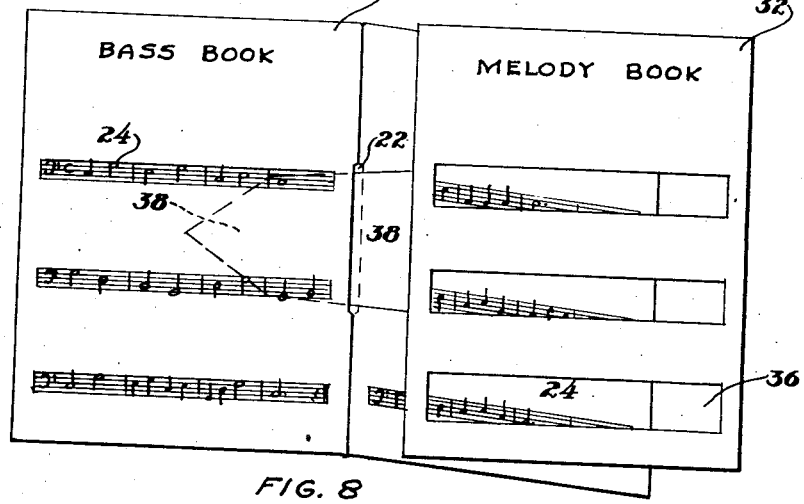
Figure 9:
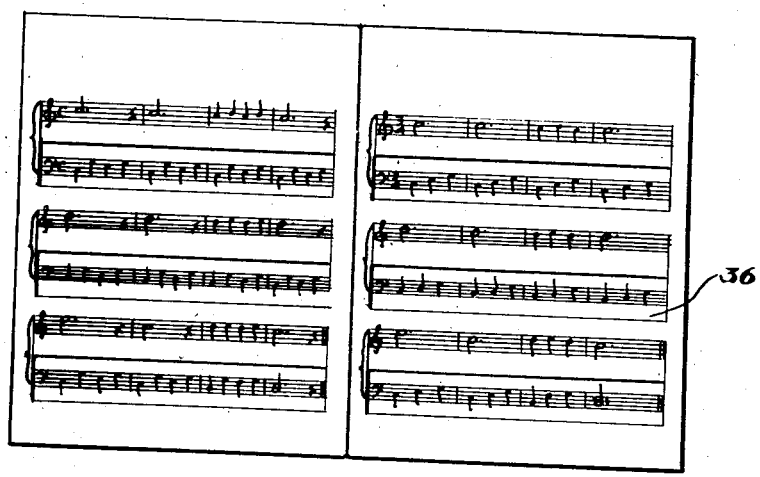
Figure 10:

To insure proper alignment of the parts, and to permit the book to be handled in the same manner as a conventional music instruction book in which bass and treble parts are printed on the same page, the cover of the melody book is provided with a tab or tongue 38 which is adapted to be passed through the slot 22 in the bass book and slipped into the pocket between the sections of the left hand cover (see Fig. 8). When so assembled, the bass and melody books form a unit in which bass and treble parts appear in wholly normal relation, as shown in Figs. 9 and 10. As the pages of the melody book are turned, different melodies appear but the same bass parts are visible through the openings 36.

The bass parts on any two facing pages need not be exactly alike. For example, the left hand pages of the bass book may contain parts written in 4/4 time, while those on the right hand pages may be written in 3/4 time, and the melodies similarly written. Thus, as the pupil progreses from one melody to the next, he need not necessarily play the identical bass part each time.

After the pupil has proceeded as far as desired through the several melodies, the melody book may be inserted between other pages of the bass book in order that left hand exercises of somewhat greater complexity may be practiced, as accompaniments to the same melodic parts, which will have become somewhat familiar and therefore relatively less difficult. Thus at no stage in the preliminary study of two-part playing need the pupil be faced with the problem of playing unfamiliar parts in both hands, but instead may approach each exercise with the feeling that one or the other of the hands will be familiar, and hence attention need not be divided either in reading bass and treble clefs, or in the execution by the left and right hands.

It is apparent, therefore, that means have been provided which afford substantial aid to a student of the piano at a stage in the instruction where the pupil frequently fails to make satisfactory progress. By breaking down the several phases of the problem so that only one step need be taken at a time, substantially greater progress may be made. The combination of separate bass and melody books, which may readily be assembled to provide a wide variety of melodies with a single bass part, and conversely a multiplicity of bass parts with the different melodies, enables a very great number of exercises to be provided in a compact instruction book, with gradually increasing order of difficulty. At the same time the student gains an understanding of chord structure and phrase balance, through the repetition of the several melodic and bass parts as the instruction proceeds.

I claim as my invention:

1. An instruction book for teaching the art of piano playing, comprising separable sections containing melody and bass parts, respectively, the melody book containing a plurality of pages bearing musical notation in the treble clef and representing a plurality of melodies of substantially similar harmonic basis, said melody book having its pages cut away below the treble staffs to provide openings at locations normally occupied by the bass staffs, the bass book containing a plurality of pages bearing musical notation in the bass clef for accompanying said melodies in the melody book, and means to effect releasable interlocking assembly of the melody book within the bass book between the pages thereof with the bass staffs of the bass book visible through the openings in the melody book to provide juxtaposed bass and melody parts.

2. An instruction book for teaching the art of piano playing, comprising separable sections containing melody and bass parts, respectively, the melody book containing a plurality of pages bearing musical notation in the treble clef and representing a plurality of melodies of substantially similar harmonic basis, said melody book having its pages cut away below the treble staffs to provide openings at locations normally occupied by the bass staffs, the bass book containing a plurality of pages bearing musical notation in the bass clef for accompanying said melodies in the melody book, and means comprising a tongue carried by the melody book and tongue-receiving means associated with the bass book and accessible between the pages thereof to permit bass and melody books to be assembled in interlocking relation with the melody book between selected pages of the bass book and with the bass staffs of the bass book visible through the openings in the melody book to provide juxtaposed bass and melody parts.

3. An instruction book for teaching the art of piano playing, comprising separable sections containing melody and bass parts, respectively, the melody book containing a plurality of pages bearing musical notation in the treble clef and representing a plurality of melodies of substantially similar harmonic basis, said melody book having its pages cut away below the treble staffs to provide openings at locations normally occupied by the bass staffs, the bass book containing a plurality of pages bearing musical notation in the bass clef for accompanying said melodies in the melody book, and means comprising a tongue carried by the melody book and a slot formed in the bass book and accessible between the several pages thereof for effecting interlocking assembly of bass and melody books with the melody book superposed on a selected page of the bass book with the bass staffs thereon visible through the openings in the melody book.

4. An instruction book for teaching the art of piano playing, comprising separable book sections, one section containing melody parts written in the treble clef and the other section containing bass parts written in the bass clef, the several parts of one book being suitable for playing interchangeably with the several parts of the other book, the pages of one book being cut away to provide openings through which, when the books are assembled in superposed relation, the parts of one book written in one clef may be viewed in normal juxtaposed relation to the parts of the other book written in the other clef, and means releasably interlocking the one book between selected pages of the other book.

ARTHUR J. MARSH.